July 20, 1965    R. F. WOODCOCK ETAL    3,195,219
ENERGY CONDUCTING DEVICE
Filed Feb. 16, 1961    2 Sheets-Sheet 1
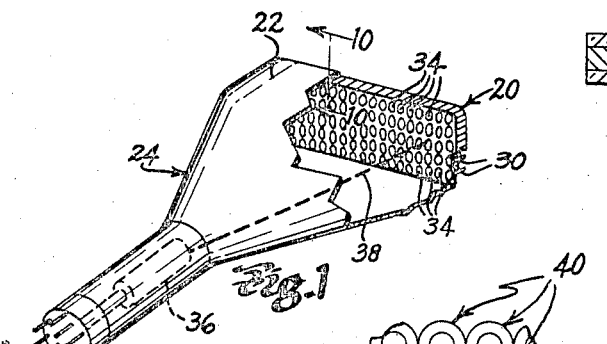
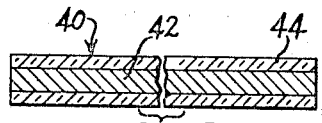
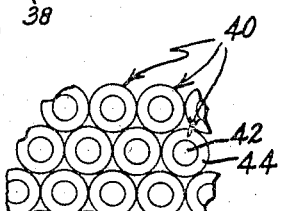
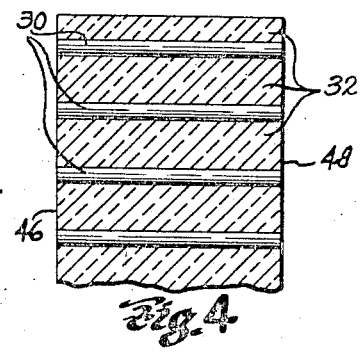
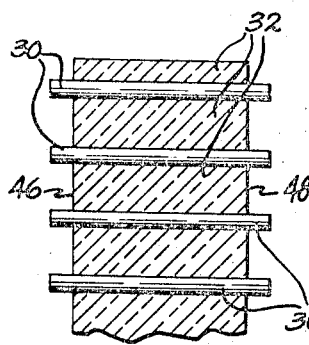
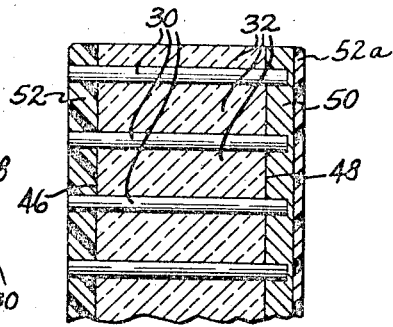
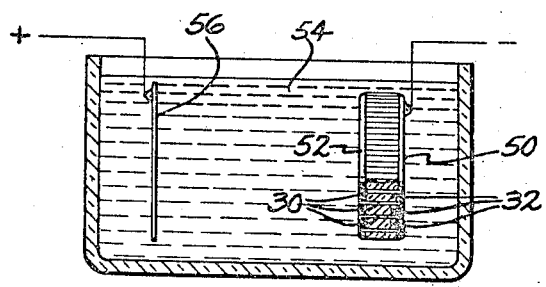
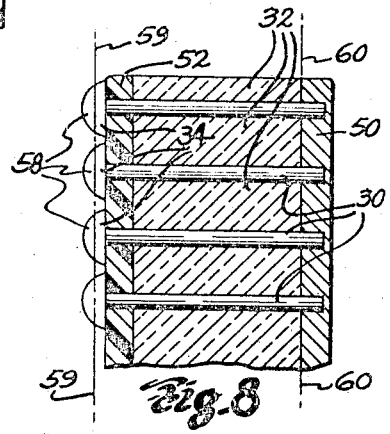
INVENTORS
RICHARD F. WOODCOCK
GEORGE A. GRANITSAS
BY
*Louis K. Gagnon*
ATTORNEY

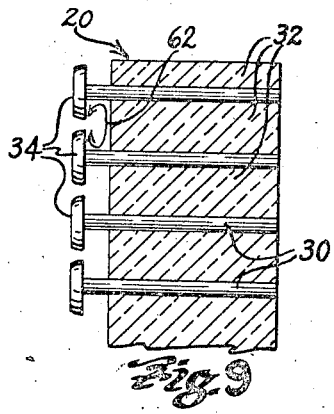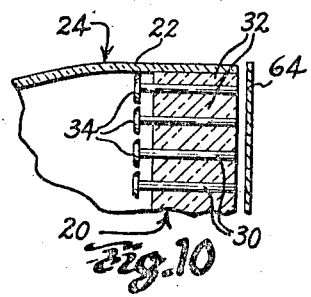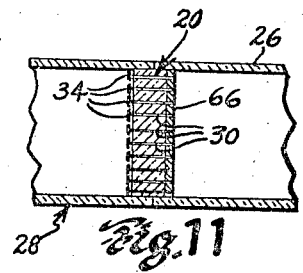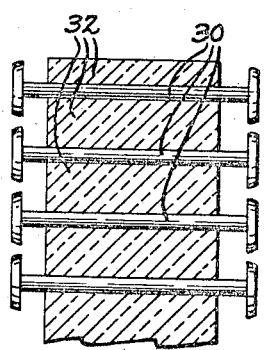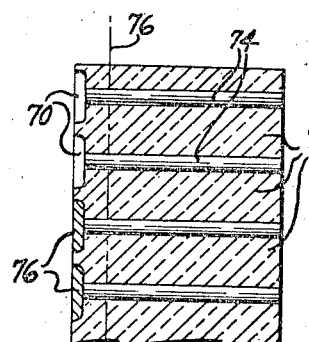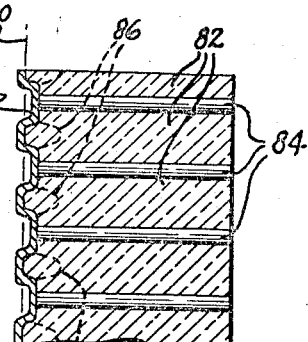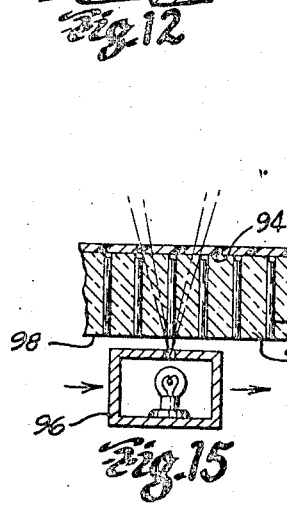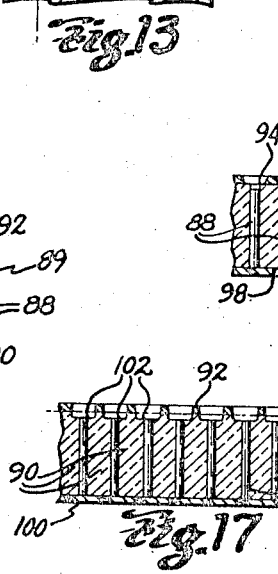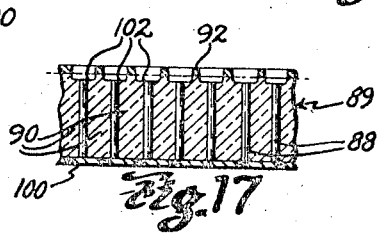

United States Patent Office 3,195,219
Patented July 20, 1965

3,195,219
ENERGY CONDUCTING DEVICE
Richard F. Woodcock, South Woodstock, Conn., and George A. Granitsas, Marlboro, Mass., assignors to American Optical Company, Southbridge, Mass., a voluntary association of Massachusetts
Filed Feb. 16, 1961, Ser. No. 89,844
9 Claims. (Cl. 29—25.18)

This invention relates to energy-conducting devices and method of making the same and has particular reference to plate-like devices of the type embodying an integrally formed arrangement of a plurality of individually insulated energy-conducting elements each adapted to receive energy adjacent one side of said device and to transfer said energy through and to a location adjacent the opposite side thereof.

Devices such as mentioned above are generally used as energy-receiving and transferring face plates for cathode ray tubes or other similar electron energy-initiating, amplifying or converting devices wherein energy is to be transferred from within the tube or device initiating the same to a location outwardly thereof at which location, means may be provided to utilize said energy by converting the same into interpretable information such as, for example, taped, printed or otherwise recorded picture information. In some instances, however, the face plates are used as coupling means and are interposed between interconnected electron devices so as to function as means for transferring energy from one such device into another. In this way, amplification and/or conversion of the energy from one form to another is accomplished in stages by means of the coupled together devices.

Conventional devices of the above character basically consist of a plurality of elongated metallic electrical conducting elements individually electrically insulated from one another and arranged in secured together side-by-side relation in the form of a plate wherein the ends of the elements are exposed at opposite sides of the resultant plate.

One of the most successful and satisfactory methods of making plates of the above general character has been found, from the standpoint of economy and practicability, to be that of assembling and fusing a plurality of glass clad metal wires of substantially uniform lengths together in side-by-side relation wherein the ends of the clad wires form the opposite faces of the resultant plate-like structure. The opposite faces of the plate are usually ground or otherwise finished to a flat or to a desired curved shape while the depth of cut is controlled to be such as to render the plate of a desired front to back thickness. It is also pointed out that the individual elements or wires are usually relatively small in cross-sectional size and, in some cases, are in the vicinity of only a few thousandths of an inch or less in diameter or they may be as much as several thousandths of an inch in diameter. When the face plates are used as electron image-transferring means, the individual element sizes are selected in accordance with the particular degree of resolution desired.

That is, in the usual mode of operation, each element of a total electron image is transferred through a single one of the energy-conducting wires and the wire sizes are selected to be such as to produce an acceptable all-over close relation thereof or picture-high grain effect.

In view of the fact that the individual energy-conducting wires are spaced a distance from each other equal to twice the thickness of their initial claddings, which distance must be sufficient to prevent "cross-talk" or electrical leakage of energy between the wires, the energy-collecting efficiency of such a conventional face plate is impaired by the fact that an electron beam or the like being scanned across the face plate must pass over the insulation between each of the energy-conducting wires in order to impinge upon their receiving ends. In doing so, electrons which strike the insulation between the wires are dissipated thereby internally of the electron device and do not contribute to the charge intended to be applied to and transferred through the wires. Furthermore, in instances where the electron beam is comparable in size to the wires, it might bypass some of the energy-receiving ends thereof.

It can be seen from the above that a greater concentration of energy in each of the wires could be accomplished if less of an electron charge which is imposed upon a face plate was allowed to strike the insulation around the wires and more of the charge was caused to be gathered by the wires. That is, if a minimum area of insulation was exposed to the electron beam adjacent the energy-receiving side of a face plate with the energy-receiving end faces of the wires enlarged to accomplish this, the efficiency of the wires, or energy-collectors as they will be referred to hereinafter, and the face plate as a whole would be greatly enhanced by reason of the fact that enlarged receiving faces on the wires would tend to collect a greater amount of electrons than usual from an electron beam scanned thereacross and funnel the resultant charge into the wires and through the face plate. In this way, substantially the full electron output of a cathode ray device could be utilized.

Accordingly, it is a principal object of this invention to improve the energy-collecting capabilities and efficiencies of face plates of the above general character by providing said face plates with improved energy-collecting and transferring elements and method of making the same.

Another object is to accomplish the above by minimizing the exposed areas of insulation on at least one of the face portions of plate-like devices of the above character through the use of energy-transferring elements so constructed and arranged therein as to have enlarged receiving and/or emitting face portions which function to collect and, in effect, funnel electrical energy into or out of the elements.

Another object is to provide a face plate construction embodying energy-conducting elements with closely related enlarged energy-receiving and/or emitting portions so constructed and arranged in the face plate as to prevent electrical leakage or "cross-talk" of energy therebetween.

Another object is to provide simple, efficient and practical means and method for providing enlarged energy-receiving and/or emitting end portions upon conducting elements of face plates of the above character.

A further object is to provide face plates having energy-conducting elements with enlarged closely related head portions more specifically for the purpose of collecting and transferring the major portion of all image information initiated and emitted as an electron beam within conventional cathode ray tubes or like devices so as to permit utilization of substantially the full electron output capabilities of such devices.

In accordance with the above, it is a still further object to provide devices of the above character for producing clearer, more intensified and detailed reproductions of electron information produced by electron-emitting devices.

Other objects and advantages of the invention will become apparent from the following description when taken in conjunction with the accompanying drawings in which:

FIG. 1 is a partially broken-away perspective view of an electron tube having a face plate of the type embodying the invention installed therein;

FIG. 2 is an enlarged cross-sectional view of an insulated energy-conducting element of the type preferably used in the construction of the basic face plate structure of the invention;

FIG. 3 is a fragmentary face view of a group of such energy-conducting elements bundled together in preparation for forming said basic face plate structure;

FIG. 4 is an enlarged fragmentary cross-sectional view diagrammatically illustrating a portion of the basic face plate structure from which devices are fabricated in accordance with the practice of this invention;

FIGS. 5, 6, 7, 8 and 9 are views similar to FIG. 4 diagrammatically illustrating steps in the method of the invention;

FIG. 10 is an enlarged fragmentary cross-sectional view taken along line 10—10 of FIG. 1 looking in the direction indicated by the arrows and further illustrating means which may be associated with the device of FIG. 1 for receiving electrical information therefrom;

FIG. 11 is a diagrammatic cross-sectional view of the device of the invention illustrated in a position of use as coupling means for transferring energy from one section of an electron device into another section thereof;

FIG. 12 illustrates a modification of the invention;

FIGS. 13 and 14 illustrate another modification; and

FIGS. 15, 16, and 17 illustrate a still further modification of the invention.

Referring more particularly to the drawings wherein like characters of reference designate like parts throughout the several views, it will be seen that the device of the invention, as shown more particularly in FIGS. 1, 10 and 11, comprises a face plate structure 20. The face plate 20 may be edge-sealed as illustrated in FIGS. 1 and 10 into one end of the glass envelope part 22 of an electron device such as a cathode ray tube 24 or, as shown in FIG. 11, similarly edge-sealed within the envelope 26 of a two-stage electron device 28 which will be described in greater detail hereinafter.

Basically, the face plate 20 embodies a plurality of wire-like electrical-conducting elements 30 extended from end-to-end through an insulating material 32. The elements 30 are in spaced substantially parallel relation with each other in the insulating material 30 and, in a preferred form of the invention, the elements 30 are provided with enlarged head parts 34 at one side of the plate 20 which are slightly laterally spaced from one another and also spaced away from the adjacent surface area of the insulating material 32.

When in use, the elements 30 of the face plate 20 function to receive electrical energy at their headed ends and to conduct said energy through the plate 20. In the case of an electron tube, such as illustrated in FIG. 1, electrical energy is initiated therein in conventional fashion by means of an electron gun 36 which fires electrons in the form of a beam 38 upon the face part or plate 20 of the tube and the beam 38 is caused to scan or sweep across the plate 20. By modulation of the flow of electrons through the use of conventional cathode ray tube operating circuits, image information is applied to the inner face portion of the plate 20. In the case of the present invention, the inner face portion of the plate 20 embodies a closely knit side-by-side arrangement of the headed parts 34 of the energy-conducting elements 30. It will become readily apparent hereinafter that the headed parts 34 of the elements 30, being larger in size than the adjoining body portions of said elements and arranged in unconnected but in close side-by-side relation with each other will function individually as collecting means for the elements 30 and, in effect, cause electrons impinging thereon to be funnelled into the body parts of the respective elements 30. With a construction of this character, it can be seen that all but a negligible amount of electrons fired from the gun 36 will engage and be picked up by the headed parts 34 of the elements 30, there being a minimum of spacing between said headed parts through which electrons may pass and strike the insulating material 32 of the face plate 20.

With the manner of construction just described, utilization of substantially the full electron output of the tube 24 is achieved.

Referring more specifically to the details of construction and procedure followed in making the face plate 20, reference is first made to FIG. 4 wherein there is shown a basic structure from which the final face plate 20 is fabricated. The structure of FIG. 4 which is plate-like in form embodies insulating material 32 through which the conducting elements 30 extend. The elements 30, at this point, are wire-like and each have a substantially uniform dimension throughout their length.

The structure of FIG. 4 may be fabricated in various different ways, the most practical of which will be set forth herein by way of example.

In view of the fact that the elements 30 may be required to be as small as one thousandth of an inch in diameter or less in some cases and must be relatively closely spaced from each other in the assembly of FIG. 4, for example at a distance of approximately .004 inch for .001 diameter elements or correspondingly wider spacings for larger elements, a preferred method for fabricating the structure of FIG. 4 would be to initially form a plurality of glass clad wires 40 (FIG. 2) having the desired wire size 42 and a thickness of cladding 44 such as to produce the necessary spacing of insulation therebetween. The glass cladding is applied to the wires 42 in conventional manner such as by shrinking a tubular glass part onto each of the wires or by dipping the wires into molten glass. A preferred selection of materials for subsequent use in devices such as electron tubes or the like would consist of stainless steel wires 42 clad with soda-lime glass or other metal and glass combinations having similar expansion and heat-softening characteristics. In all cases, the glasses and metals would be selected in accordance with the intended function of the face plate to be formed therefrom and further in accordance with the materials of the particular device to which the resultant face plate is to be secured for use. Since most cathode ray tubes are provided with envelope parts formed of glasses with expansion coefficients similar to soda-lime glass and the face plate 20 is usually secured thereto by fusion, it should be apparent that the use of soda-lime glass or glasses having similar heat-softening and expansion characteristics are preferred in the construction of the face plates 20. By matching the characteristics of the insulating glass in the face plates to those of the glasses of the articles to receive the face plates, problems of subsequent assembly of the parts are minimized and fused joinders can be made without excessively distorting one or the other of said parts or causing fracturing thereof.

Other combinations of materials which may be used in the fabrication of the glass clad wires 40 would be tungsten and Pyrex glass for the respective wire part 42 and cladding 44. Further, by way of example, other metals which might be used along with known compatible crown-type or soda-lime cladding glasses would be the following:

Example 1

| | |
|---|---|
| Carbon | .12% maximum. |
| Manganese | 1% maximum. |
| Silicon | 1% maximum. |
| Chromium | 14% to 18%. |
| Iron | Balance. |

Example 2

| | |
|---|---|
| Nickel | 41.5% to 42.5%. |
| Chromium | 5.4% to 5.9%. |
| Aluminum | .15% maximum. |
| Carbon | .07% maximum. |
| Manganese | .15% to .25%. |
| Phosphorous | .025%. |
| Silicon | .15% to .30%. |
| Iron | Balance. |

Example 3

| | |
|---|---|
| Nickel | 42% to 51%. |
| Chromium | 1% to 6%. |
| Iron | Balance. |

Once having formed a plurality of glass-clad wires 40, the assembly of FIG. 4 is made by bundling the wires together in compact side-by-side relation preferably as shown diagrammatically in FIG. 3 and with controlled heat and lateral pressures, causing the glasses of the assembly of FIG. 3 to fuse together into a solid mass such as illustrated in FIG. 4. The wires may be of shapes other than the circular shapes shown. For example, square or hexagonal wires 40 would inherently interfit more readily in making the assembly of FIG. 3 and somewhat lower temperatures and less lateral pressure might be used to form the fused assembly of FIG. 4.

In fusing an assembly such as FIG. 3 which is formed of round wires 40 having core or wire parts 42 of stainless steel and claddings 44 of soda-lime glass, a temperature of approximately 1300° F. with a lateral compressing force of approximately 1.3 lbs./sq. inch would produce satisfactory results.

It should be understood that the assembly of FIG. 4 might be made by selecting a solid plate of glass of a desired peripheral shape and size, providing openings therethrough by various known techniques such as etching, drilling or the like and inserting metallic wire members into the openings or filling said openings with powdered metal compositions or the like to form electrical-conducting elements 30 surrounded by and embedded in an insulating material 32. Also, an array of wires may be glass-insulated by placing a frit between each of the wires and firing the assembly to fuse the frit and wires together into a solid mass. In place of the frit, molten glass may be poured over the wires.

Once having formed the structure of FIG. 4 which is essentially a solid glass plate having the electrical-conducting elements 30 passing completely therethrough and air tightly sealed therein, the opposite sides 46 and 48, if not flat or regular in shape with the respective ends of the elements 30 flush therewith, are ground or otherwise cut to be so.

Next, the structure of FIG. 4 is placed in an acid bath to etch away the glass material 32 at each of the sides 46 and 48 to expose the adjacent and sections of the elements 30 as shown in FIG. 5. Commercial concentrated hydrofluoric acid is used for this operation and the time period of immersion therein is controlled in accordance with the depth of etching desired. Hydrofluoric acid will not appreciably attack the steel elements 30 but will produce the desired removal of the glass insulation 32. Iron fluoride formed on elements 30 during the etching of glass 32 in hydrofluoric acid is removed subsequent to the glass etching operation. Being readily soluble in either sulphuric acid or water, the iron fluoride is removed by immersion of the face plate structure in concentrated sulphuric acid or, alternatively, in water, preferably hot water.

The resultant protrusion of the elements 30 at one side (48 for example) of the structure shown in FIG. 4 is provided for the purpose of subsequently electrically connecting the elements 30 together and the purpose of the protrusion of the elements 30 at the opposite side 46 is to provide the extent of protrusion or relief desired between the above-mentioned head portions 34 of the elements 30 in the finished face plate 20. This protrusion of the elements 30 at the side 46 (FIG. 5) would be in the vicinity of from .001 to .010 inch for elements 30 which are spaced apart in the insulation 32 a distance of approximately .003 inch. These dimensions are all given by way of example.

With the face plate structure acid-etched, as shown in FIG. 5, and iron fluoride removed from elements 30, it is next covered on its side 48 preferably with a metal amalgam 50 such as dental silver in mercury (see FIG. 6) which is applied in such a state of viscosity as to fill in and around the adjacent ends of the elements 30 making a secure electrical connection with each and every one of said elements. The amalgam 50 is allowed to harden in place. It should be understood that other metal amalgams may be used for this purpose or, if desired, commercially available electrical-conducting epoxies or plastics would serve the purpose. These epoxies or plastics are metal-loaded, that is, filled with metallic particles and are somewhat less effective as electrical conductors than amalgams but are, however, less expensive and will perform the intended function of the coating 50.

The opposite side 46 of the structure in FIG. 5 is provided with a coating 52 of electrically-insulating plastic, wax, epoxy or any other similarly characterized material (FIG. 6). Also, if it is desired to prevent the amalgam from becoming plated, the amalgam coating 50 is also covered preferably with a thin coating 52a of the electrically-insulating coating 52, as illustrated in FIG. 6. For reasons which will become apparent hereinafter, this coating 52 is selected to be of such character as to be relatively easily removable and in one of the final steps of the process, it is removed by being dissolved, melted or burned away.

The coating 52 should be applied carefully so as to be flush with the adjacent ends of the elements 30 without contaminating said ends or it is applied by dipping, spraying or printing and is removed from the said ends of the elements 30 by grinding or scraping. In all cases, the adjacent ends of the elements 30 are cleaned and rendered free of foreign matter and/or oxidation, if present.

An electrical contact of negative potential is next made to the coating 50 and the structure of FIG. 5 is immersed in a plating bath 54, as shown in FIG. 7, with its side having the coating 52 facing a positively charged electrode 56 in said bath 54.

A conventional plating procedure is then followed to produce a build-up of the particular metal of the plating bath upon the exposed ends of the elements 30. This is shown diagrammatically in FIG. 8 wherein it can be seen that the built-up portions 58 overlap the adjacent faces of the elements 30. The amount of build-up of plating material is controlled to produce a desired spacing between the parts 58. As an example, a typical spacing would be approximately .001 inch or less for elements 30 of approximately .001 inch in diameter and initially spaced from each other in the insulation 32 approximately .003 inch apart. The plating cycle is controlled either by visually examining the extent of build-up or by timing the plating cycle in accordance with conditions relating to the characteristics of the materials used in the plating bath 54, concentration of the bath, and potential applied thereto.

Copper platings are preferred in the forming of the portions 58. However, silver, chromium or other platings may be used. In all cases, the plating is done conventionally and with standard equipment.

As shown in FIG. 8, the portions 58 inherently become rounded as they build up in the plating bath 54 and, in order to produce a desired overlap on the coating 52, they become excessively thick through their midportions. Because of this, the portions 58 are ground down to a thickness indicated by the dot-dash line 59 to form the ultimate shape of the head parts 34. The thickness of the head parts 34 is preferably held to be approximately equal to the diametrical dimension of the body portion of the elements 30, that is, the portion which passes through the glass insulation 32.

Finishing of the face plate is then accomplished by removing the coating 52 with a suitable solvent or by burning or melting the same depending upon the nature of material selected for the coating 52. Also, the amalgam coating 50 is removed preferably by grinding the face plate down to a depth indicated by the dot-dash line 60. In so doing, the adjacent ends of the elements 30 will become flush with the resultant energy-emitting face of the plate 20.

The plate 20, as it now appears (see FIGS. 9 and 10), has the headed parts 34 of the elements 32 in relief so that "cross-talk" of energy or electrical leakage between the headed parts 34 is avoided by reason of the fact that electrical energy would have to travel along a relatively long path such as illustrated by arrow 62 in FIG. 9 in order to leak from one head part 34 to another. This path being across a substantial width of insulation 32 would, therefore, prevent leakage. The spacing between the head parts 34, which is controlled as mentioned above, is such as to prevent a jumping of electrical energy from one head part to another while, at the same time, being so small as to prevent any appreciable amount of electrons from a beam such as 38 (FIG. 1) from entering the same without striking and being collected by the adjacent head parts 34. Thus, practically the entire flow of electrons impressed upon a face plate 20 will be picked up by the head parts 34 and the charge resulting therefrom will be effectively funneled into the respective adjoining body parts of the elements 30. In this way, utilization of substantially the full output of an electron discharge device is made possible.

As illustrated in FIG. 10, the face plate 20, when used in a cathode ray tube, may be employed as means to apply a charge to a plate or the like 64 which is receptive to electrical charges and which, in turn, would be used in conventional fashion to make reproductions of electron images created by the tube 24. That is, the charge plate 64 when connected to a suitable potential would receive electrical charges passed through the elements 30 and be provided with an all-over pattern of charges each representative of an element of a picture, for example. Powdered graphite or powdered metallic materials applied to the plate 64 would be attracted to said charged areas of the plate 64 with the result of forming the picture image. By fixing said materials to the plate 64, a permanent record of the image is provided.

The above is only an example of a particular use for a face plate 20, there obviously being a multitude of other uses. One other, for example, might be to use the plate 20 as coupling means in the manner diagrammatically illustrated in FIG. 11. In this way, a photo-emissive, electroluminescent or other suitable coatings 66 might be applied to the plate 20 or supported near the plate so as to receive energy from the elements 30 and convert the same into a different form or make use of it in its present form.

It should be understood that for special applications, it may be desirable to provide headed portions on the elements 30 of a face plate at each side thereof as illustrated in FIG. 12. This would be accomplished by following the above procedure, doing one side of the face plate at a time. In such a case, instead of using a hard-setting amalgam, it would be preferable to use an easily removable electrical conducting plastic during the finishing of the second side of the face plate since the electrical contact would have to be made upon the first finished head parts of the elements 30 and subsequently removed therefrom without damaging said first finished head parts.

It is also pointed out that the face plates 20 may be formed immediately upon the insulation 32, if desired, rather than in relief, as shown. This would be accomplished by eliminating the plastic coating 52 used in the above-described process.

An alternative method of making face plates of the above character is shown in FIGS. 13 and 14 wherein saucer-like areas 70 are etched in the glass-insulating material 72 of a structure embodying metallic-conducting elements 74. This is done by first recessing the elements 74 to a desired depth in the glass 72 by exposure to an etching solution such as aqua regia which will etch the metal pins without substantially affecting the glass 72. Next, the surface area of the glass which is not intended to be etched, is covered with an acid-resistant material such as plastic, wax, epoxy or the like and the uncovered areas are exposed to an acid such as hydrofluoric acid which will etch out areas such as 70 in the glass without affecting the metal of the elements 74. The areas 70 are then filled with a metal amalgam or a sinterable electrically-conducting metallic powder or the like 76 which, when hardened naturally or by the application of heat, will attach itself firmly to the elements 74. This forms the enlarged heads on the elements 74. If it is desired to place these heads in relief after the acid-resistant coating is removed therefrom, the side of the face plate adjacent the headed ends of the elements 74 is etched again by hydrofluoric acid down to the dot-dash line 76 or to any other desired depth.

Another technique for filling the areas 70 or, at least partially filling the same, would be to use an evaporation process or to spray or paint an electrical-conducting solution such as aquadag or SnCl or the like over the etched-out surface to form an electrically-conducting coating 78 (FIG. 14). By grinding the resultant article shown in FIG. 14 to a depth indicated by the dot-dash line 80, removal of the coating 78 along the protruding areas of insulation 82 between the elements 84 will cause the elements 84 to become electrically isolated from one another and the remaining separated portions of the coatings 78 will be in the form of enlarged head parts on each of the elements 84. If it is desired to place these head parts in relief, the glass 82 of the structure of FIG. 14 is then etched to a desired depth between the separated portions of the coating 78 generally as indicated by dot-dash lines 86.

In FIGS. 15–17, there is shown a further modification of the invention wherein saucer-like areas may be provided in a face plate structure by a photo-resist technique.

In this manner of operation, the metallic-conducting elements 88 of an initial face plate assembly 89 embodying glass-insulation means 90 between the elements 88 are recessed by etching with aqua regia which will not appreciably attack the glass 90. After having done so, a light-sensitive film 92 is painted or otherwise applied to the surface 94. The film 92 is selected to be of such character as to be rendered substantially non-soluble in glass-etching solutions after having once been exposed to light and when unexposed or only moderately exposed, it is readily soluble in organic solvents. Such films are readily available commercially in various forms which are selectively sensitive to different wave lengths of light and are readily removable through the use of various available organic solvents when unexposed or only lightly exposed to light. As an example, a film-forming material known commercially as Kodak Photoresist which is characterized in that it becomes hard when exposed to light might be used. A commercially known solvent such as Kodak Photoresist developer would be used to wash away unexposed portions of the film material.

When the assembly 89 is coated with the film 92, it is exposed to light preferably by means of a slit lamp arrangement 96 which is passed across the opposite side 98 of the assembly 89 as shown diagrammatically. The elements 88 will then cast a shadow of themselves upon the film 92 directly over their ends opposite to the light and the remaining portion of the film 92 will become exposed to said light and rendered insoluble. The film 92, after exposure, is washed with a proper solvent to remove the unexposed and/or lightly exposed areas thereof directly over and adjacent the ends of the elements 88, as shown in FIG. 16. The assembly 89 is then preferably coated with an acid-resistant material 100 on its surface 98 to protect said surface 98 from attack by an acid solution to be subsequently applied to the assembly. The coating 100 may be dispensed with provided the side 98 is not exposed to said acid. Hydrofluoric acid is next applied to the now exposed areas of the surface 94 for a period of time sufficient to etch out the glass 90 and produce the saucer-like depressions 102 shown in FIG. 17. The films of coatings 92 and 100 are removed with appropriate solvents, or melted or burned away and the assembly 89 which has now taken on the form of the assembly shown in FIG. 17 is finished as described hereinabove with relation to FIGS. 13 or 14 to provide the end of the elements 88 with enlarged head portions.

From the foregoing, it will be seen that simple, efficient and economical means and method have been provided for accomplishing all of the objects and advantages of the invention as expressed in the accompanying claims and the invention is not limited to the exact matters shown and described as only the preferred matters have been given by way of illustration.

Having described our invention, we claim:

1. The method of making an energy-conducting device from a structure comprising an integral assembly of a plurality of electrically-conductive wires supported in individually spaced side-by-side relationship substantially throughout their lengths within an electrical insulating matrix material, said method comprising placing an electrically-conductive material on each of the corresponding one ends of said wires adjacent at least one side of said structure in amounts controlled to form enlarged head parts on respective wires with portions thereof extending laterally into relatively close but individually spaced edge-to-edge relationship with each other, and removing a substantial thickness of said matrix material from between portions of said wires adjacent said one side of the structure during one stage of the process.

2. The method of claim 1 in which said step of removing a thickness of said matrix material is performed subsequent to the step of forming said head parts on said wires.

3. The method of claim 1 in which said step of removing the thickness of said matrix material is performed prior to the step of forming said head parts on said wires.

4. The method of claim 3 including the steps of replacing said removed thickness of matrix material by an electrical insulating material which is more readily removable than the material of said matrix and against which laterally extending portions of said electrodeposited head parts are formed and thereafter removing said electrical insulating replacement material.

5. The method of making an energy-conducting device comprising the steps of bundling of a multiplicity of glass clad wires together in intimate side-by-side relation with each other to form a bundle, heating said bundle to a temperature sufficient to fuse said claddings together as a matrix between said wires, electrodepositing an electrically-conductive material on each of the corresponding one ends of said wires adjacent at least one side of said structure in amounts controlled to form enlarged head parts on respective wires with portions thereof extending laterally into relatively close but individually spaced edge-to-edge relationship with each other and removing by selective etching during one stage of the process a substantial thickness of said matrix material from between portions of said wires adjacent said one side of said structure 6. The method of claim 5 in which said step of removing the thickness of said matrix material is performed subsequent to the step of forming said head parts on said wires.

7. The method of claim 5 in which said step of removing the thickness of said matrix material is performed prior to the step of forming said head parts on said wires.

8. The method of claim 7 including the steps of replacing said removed thickness of matrix material by an electrical insulating material which is more readily removable than the material of said matrix and upon which laterally extending portions of said electrodeposited head parts are formed and thereafter removing said electrical insulating replacement material.

9. The method of making an energy-conducting device from a structure comprising an integral assembly of a plurality of electrically-conductive wires supported in individually spaced, side-by-side relationship substantially throughout their lengths by an electrical insulating matrix material, said method comprising recessing the one ends of said wires adjacent at least one side of said structure to a preselected depth in said matrix material by etching same with a medium which will not substantially affect the material of said matrix, etching said matrix material at least to the depth of recessing of said wires throughout isolated areas of said one side of said structure, each area being approximately centered over one of said wires and of a controlled diameter greater than that of a respective adjacent wire, depositing an electrically-conductive material in said areas in adjoining relationship with said respective recessed ends of said wires to form head parts thereon and removing a substantial thickness of said matrix material from between said head parts.

References Cited by the Examiner

UNITED STATES PATENTS

| 2,160,510 | 5/39 | Moller et al. | 29—25.14 |
|---|---|---|---|
| 2,197,753 | 4/40 | Liebmann | 29—25.14 |
| 2,286,478 | 6/42 | Farnsworth | 29—25.18 |
| 2,289,205 | 7/42 | Nagy et al. | 313—73 X |
| 2,522,291 | 9/50 | Morrison | 313—73 X |
| 2,598,317 | 5/52 | Teal | 29—25.14 |
| 2,944,322 | 7/60 | Colgate | 29—25.14 |
| 2,952,796 | 9/60 | Crews et al. | 315—21 |
| 2,978,607 | 4/61 | Borden | 315—21 |

FOREIGN PATENTS 927,092  10/47  France.

RICHARD H. EANES, JR., *Primary Examiner.*
RALPH G. NILSON, *Examiner.*